I. KEEFER.

Assignor to O. D. LEVIS.

RUDDER FOR VESSELS.

No. 10,514. Reissued Aug. 26, 1884.

Witnesses:
C. B. Boatwick
Chas W Bradley

Inventor.
Israel Keefer
Per. O D Levis
his attorney

N. PETERS, Photo-Lithographer, Washington, D. C.

UNITED STATES PATENT OFFICE.

ISRAEL KEEFER, OF PITTSBURG, PENNSYLVANIA, ASSIGNOR TO O. D. LEVIS, OF SAME PLACE.

RUDDER FOR VESSELS.

SPECIFICATION forming part of Reissued Letters Patent No. 10,514, dated August 26, 1884.

Original No. 282,643, dated August 7, 1883. Application for reissue filed October 16, 1883.

*To all whom it may concern:*

Be it known that I, ISRAEL KEEFER, a citizen of the United States, residing at Pittsburg, in the county of Allegheny and State of Pennsylvania, have made an improvement in that class of rudders usually attached to the stern of water-craft as a means of guiding or governing the same.

My invention consists in the application to and combination with a boat-rudder of a broad flange or cleat arrangement, and projecting horizontally from each side thereof at or near its bottom, so that in a change of the rudder to either direction the water will be concentrated or gathered upon and made to operate against the vertical blade of the rudder with a greater degree of force than it would if such flange or cleat were not used; and in this respect it is particularly advantageous and useful in every class of boats that require turning within narrow limits, and especially Western steamboats navigating contracted rivers, bayous, and similar places diminished with respect to breadth.

To enable others to understand my invention, I will proceed to describe it by reference to the accompanying drawings, wherein—

Figure 1:
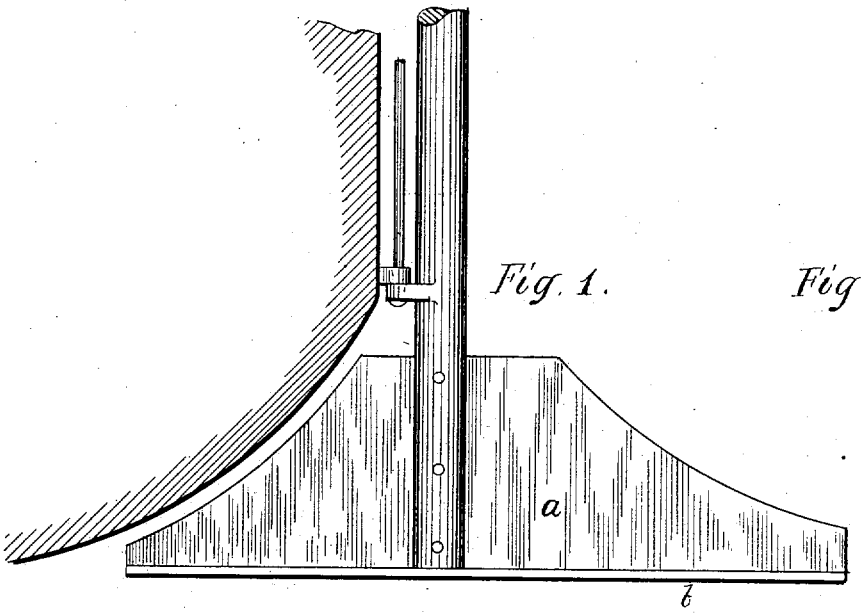
Figure 2:
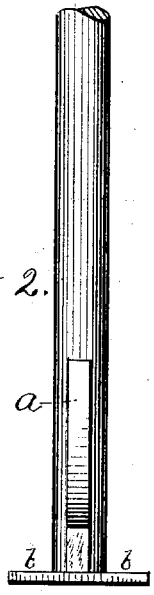
Figure 3:
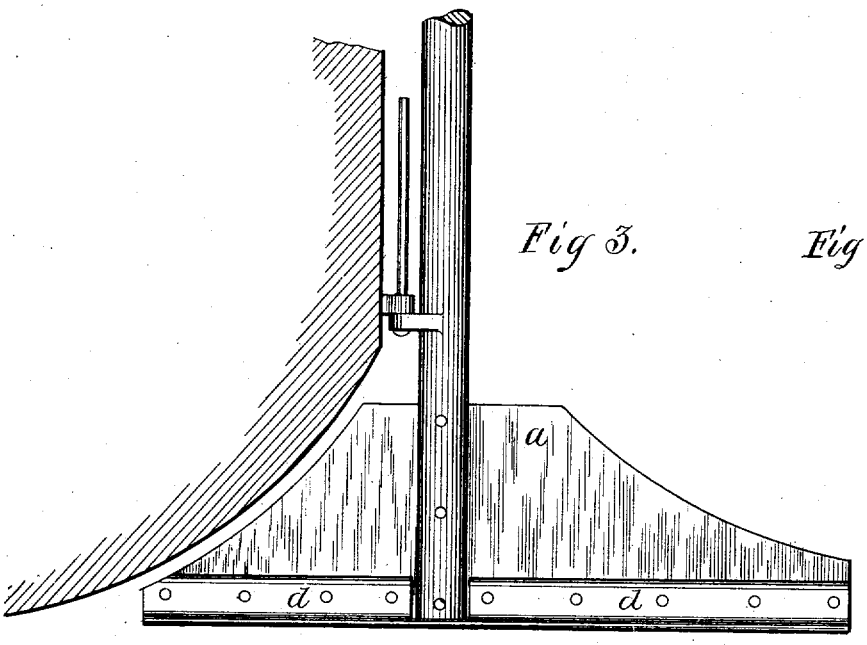
Figure 4:
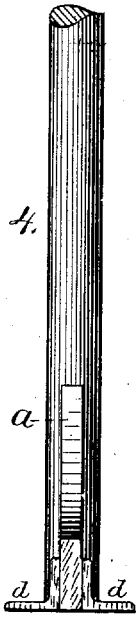

Figure 1 represents a side elevation of an ordinary balanced rudder that, in accordance with my invention, has a broad flange or cleat projecting horizontally from each side thereof and along its entire bottom. Fig. 2 represents a front or end view of the same; Fig. 3, a side elevation of a similar rudder, wherein the side flanges are formed of bars of angle-iron bolted thereto. Fig. 4 is a front or end view of the same.

My invention is applicable to any sort of pivoted rudder having a blade extending some distance from its post, and which blade may be either arranged wholly on one side of the post or partially on both sides, after the manner of balanced rudders generally; but in order to accomplish the object of my invention, I provide the rudder-blade *a* with a broad flange, *b*, that projects horizontally from each side thereof, preferably along its entire bottom, and these flanges may be constructed in one piece and spiked or otherwise affixed to the rudder by any manner of means that will answer the purpose; or the flanges may consist of two bars, *d*, of angle-iron, secured to the bottom part of the rudder-blade *a* by a series of transverse bolts, after the manner shown in Fig. 3, and various modifications may be made therein without departing from the principle of my invention.

Having described my invention, I claim—

1. A boat-rudder provided with a broad flange or cleat projecting horizontally from each side thereof and at right angles to the rudder-post, said flange or cleat running the length of the rudder, substantially as described, and for the purposes set forth.

2. A boat-rudder provided with a broad flange or cleat projecting horizontally from each side thereof the entire bottom length of the rudder-blade.

3. A boat-rudder provided with a broad flange projecting sidewise from and secured directly to and along the bottom of the rudder-blade.

ISRAEL $\overset{\text{his}}{\underset{\text{mark.}}{\times}}$ KEEFER.

Witnesses:
L. A. HEENEY,
D. NOBLE.